US012632416B2

(12) United States Patent
Gandhi et al.

(10) Patent No.: US 12,632,416 B2
(45) Date of Patent: May 19, 2026

(54) REPRESENTING AND USING METADATA VIA THE USE OF GRAPH DATABASE

(71) Applicant: Boost SubscriberCo L.L.C., Englewood, CO (US)

(72) Inventors: Darshit Gandhi, Centennial, CO (US); Tomer Danon, Denver, CO (US); Hamza Nasir Khokhar, Denver, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/117,169

(22) Filed: Mar. 3, 2023

(65) Prior Publication Data

US 2024/0296145 A1 Sep. 5, 2024

(51) Int. Cl.
*G06F 16/14* (2019.01)
*G06F 16/901* (2019.01)

(52) U.S. Cl.
CPC ........ *G06F 16/156* (2019.01); *G06F 16/9024* (2019.01)

(58) Field of Classification Search
CPC .............. G06F 16/156; G06F 16/9024; G06F 16/1734; G06F 16/128
USPC ........................................................ 707/715
See application file for complete search history.

(56) References Cited

U.S. PATENT DOCUMENTS

| | | | | |
|---|---|---|---|---|
| 2012/0023181 A1* | 1/2012 | Yuan | | H04L 67/561 |
| | | | | 709/206 |
| 2012/0170847 A1* | 7/2012 | Tsukidate | | G06F 16/583 |
| | | | | 382/190 |
| 2014/0095560 A1* | 4/2014 | Ikai | | G06F 8/34 |
| | | | | 707/829 |
| 2014/0324921 A1* | 10/2014 | Tobita | | G06F 16/583 |
| | | | | 707/812 |
| 2015/0161172 A1* | 6/2015 | Bengio | | G06V 20/35 |
| | | | | 707/749 |
| 2017/0090889 A1* | 3/2017 | Hale | | G06F 11/3604 |
| 2019/0236093 A1* | 8/2019 | Andavarapu | | G06F 16/432 |
| 2020/0210316 A1* | 7/2020 | Cuprak | | G06F 16/9024 |
| 2020/0320553 A1* | 10/2020 | John | | G06Q 30/0202 |
| 2020/0356562 A1* | 11/2020 | Nayak | | G06F 16/9024 |
| 2021/0303511 A1* | 9/2021 | Karr | | G06F 16/1824 |
| 2022/0096021 A1* | 3/2022 | Zhong | | G16H 20/10 |
| 2022/0284048 A1* | 9/2022 | Pruitt | | G06F 16/3328 |
| 2023/0045347 A1* | 2/2023 | Grady | | G06N 5/02 |

(Continued)

*Primary Examiner* — Cam Y T Truong
(74) *Attorney, Agent, or Firm* — Fish & Richardson P.C.

(57) ABSTRACT

This disclosure relates to representing and using metadata via graph database. In some aspects, a method includes receiving, at one or more computing devices, first metadata associated with data files from one or more data sources, the first metadata representing a plurality of features of associated data included in the data files, the plurality of features including at least one of a file name, a table name, an attribute, a row name, and a column name; determining relationships among the plurality of features to generate second metadata representing content of the data files; and generating a graph database representing the content of the data files, the graph database including a set of nodes and a set of edges, wherein each node in the set of nodes represents a feature of the plurality of features, and each edge represents a relationship between two nodes in the set of nodes.

20 Claims, 5 Drawing Sheets

200

(56)                    References Cited

U.S. PATENT DOCUMENTS

2023/0185768 A1*   6/2023  Inghelbrecht ............ G06N 3/08
                                                                706/12
2023/0351287 A1*  11/2023  Thompson .............. G06F 16/26
2023/0394010 A1*  12/2023  Gupta ................. G06F 16/1748
2023/0394722 A1*  12/2023  Shrivastava .......... G06F 16/288
2024/0004644 A1*   1/2024  Makkar .................... G06F 8/71
2024/0111750 A1*   4/2024  Abrahamian ........... G06F 16/23
2024/0289492 A1*   8/2024  Gupta ................. G06F 16/3347

* cited by examiner

400

REPRESENTING AND USING METADATA VIA THE USE OF GRAPH DATABASE

TECHNICAL FIELD

This specification generally relates to data processing.

BACKGROUND

Metadata is data that provides information about data. Metadata enriches the data with information about one or more aspects of the data. Metadata insights can facilitate efficient processing and understanding of data.

SUMMARY

In one aspect, this document describes a method for generating metadata via graph database. The method includes receiving, at one or more computing devices, first metadata associated with data files from one or more data sources, the first metadata representing a plurality of features of associated data included in the data files, the plurality of features including at least one of a file name, a table name, an attribute, a row name, and a column name; determining, by the one or more computing devices, relationships among the plurality of features to generate second metadata representing content of the data files from the one or more data sources; and generating, by the one or more computing devices, a graph database representing the content of the data files from the one or more data sources, the graph database including a set of nodes and a set of edges, wherein each node in the set of nodes represents a feature of the plurality of features, and each edge represents a relationship between two nodes in the set of nodes.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the first metadata of a data file can be included in a data dictionary associated with the data file.

In some implementations, determining the relationship among the plurality of features can include: determining that two data files share a same attribute, wherein the same attribute is named same or differently in the two data files; determining that a data file belongs to a data source; determining that a data file includes one or more attributes; and determining that two nodes share a same tag.

In some implementations, the method can include adding additional attributes for data included in the first metadata. In some implementations, the method can include removing redundancy included in the first metadata of different data files, wherein removing redundancy comprises: determining that a same attribute is included in different first metadata of the different data files. In some implementations, the method can include determining patterns of the data files from the graph database using natural language processing.

In some implementations, nodes included in the graph database can represent data files, data sources, attributes, and tags, and edges included in the graph database can represent relationships among the data files, relationships between the data files and the data sources, relationships among the data sources, relationships among attributes of different data files; and relationships between the attributes and the data files.

Particular implementations of the subject matter described in this disclosure can be implemented so as to realize one or more of the following advantages. An efficient way of processing metadata associated with data from various sources is provided, in which data from myriad and diverse sources can be visualized and processed in a unified representation by using a graph database. By representing the content of the data files from one or more data sources using a directed graph of nodes and edges, complex relationships among the data files can be visually represented, which in turn can be used to provide insights that may not be otherwise available. The insights in turn may be used by users (e.g., developers) to efficiently develop data products. For example, patterns extracted from the graph database can include newly derived relationships between different data files and/or different data sources and can be used in different applications and data developments. Furthermore, because the graph database provides a map of the relationships of data files, a user can identify and retrieve required data in a fast and efficient way.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

With the development of information technology, data to be used in different applications can be large in volume and complex in variety. The data can include a great quantity of diverse information from various data sources/data owners. Obtaining insight of the data can be important to create and capture value from the data, for example, to develop data products.

The technology described herein provides an efficient way of processing metadata associated with data from various sources via a graph database, such that data from myriad and diverse sources can be visualized and processed in a unified representation. The data from various sources can include a set of data files, e.g., tables, spreadsheets, databases, and the like. The data can be from different data sources. A data source can provide the data files and one or more data dictionaries describing the data files. The data dictionary can include information or metadata about data of the data files, such as attributes, meaning, origin, usage, and format of the data included in the data files.

The technology described herein can analyze the data dictionaries associated with the data files and obtain insight of the data files in an automatic manner with minimum to no human efforts. The metadata included in the data dictionaries can represent a plurality of features of data included in the data files. Relationships among the plurality of features can be determined. A graph database can be generated representing the content of the data files from one or more data sources. The graph database can be a directed graph that includes a set of nodes and a set of edges, each node representing a feature of the plurality of features, and each edge representing a relationship between two nodes in the set of nodes.

Such a graph database can capture the relationships (e.g., interconnections and interrelationships) of the data files from various data sources. Such relationships provide extra insight that were not previously provided by the various data sources for the data of the data files which, in some implementations, are in tabular format. Because the graph database can represent the relationships in a directed graph, the relationships can be easily recognized and digested by users (e.g., developers) for utilizing the insight of the data and developing data products.

In some examples, natural language processing (NLP) can be performed based on the graph database to extract patterns embedded in the graph database. Such patterns can include newly derived relationships between different data files and/or different data sources and can be used in different applications or data developments.

Furthermore, because the graph database provides a map of the relationships of data files, a user can identify and retrieve required data in a fast and efficient way.

Figure 1:
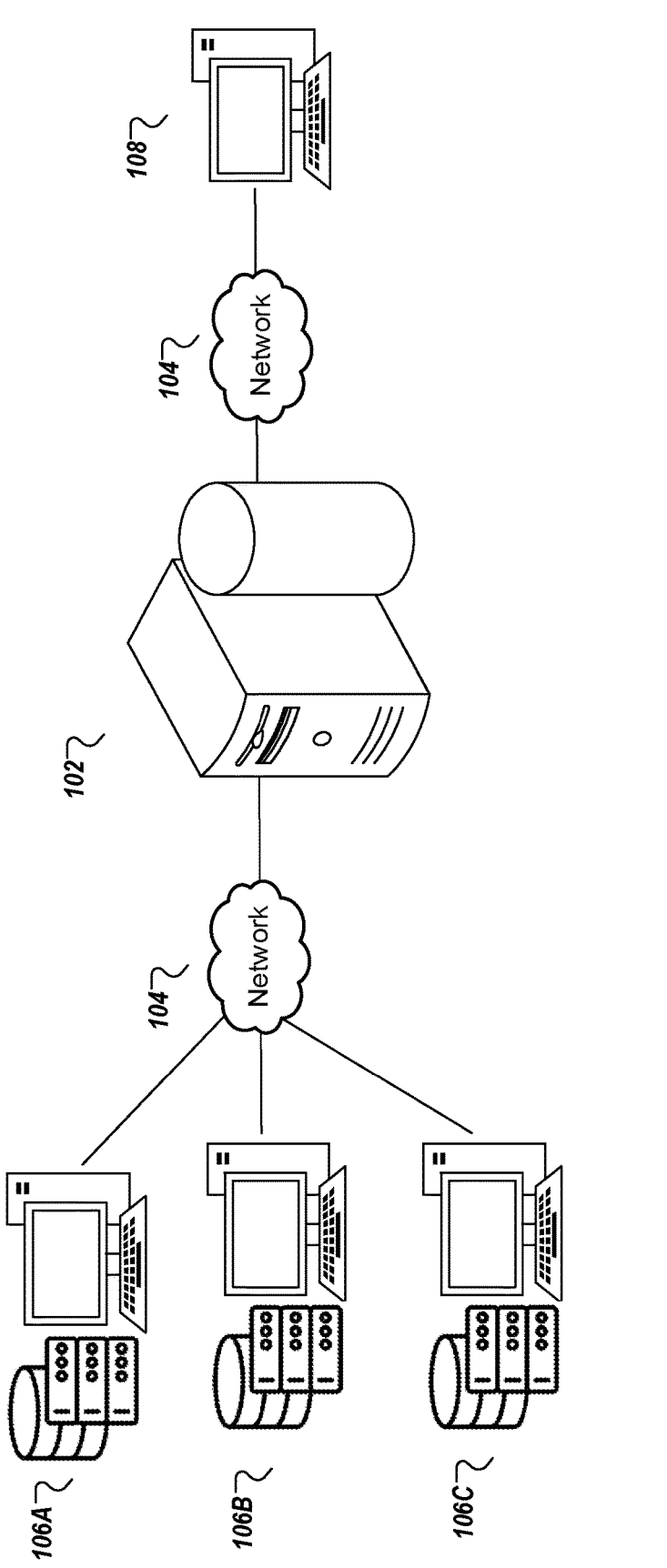
FIG. 1 is an example system for generating a graph database.

FIG. 1 is a block diagram of an example environment 100 for generating a graph database in accordance with technology described herein. The example environment 100 includes a computing system 102 including one or more computing devices, a network 104, one or more data sources 106A-106C (collectively referred to as 106), and a user device 108.

The one or more data sources 106 can be located in different sites either on the same network or entirely different networks. Each data source 106 can have its own data. The data of the one or more data sources 106 can include a set of data files, e.g., tables, databases, and the like. Each data source 106 can have one or more data dictionaries describing its data files. The data dictionary can include information or metadata about data of the data files, such as attributes, meaning, origin, usage, and format of the data included in the data files. For example, the metadata for the data of the data files can include a plurality of features of associated data included in the data files. The plurality of features can include at least one of a file name, a table name, an attribute, a row name, and a column name.

The computing system 102 can receive, from the one or more data sources 106 over the network 104, the data dictionaries that includes the plurality of features of each data source's data files. The computing system 102 can determine relationships among the plurality of features of those data files.

The computing system 102 can generate a graph database representing content of the data files from one or more data sources 106. The graph database can be represented as a directed graph that includes a set of nodes and a set of edges. Each node in the set of nodes can represent a feature of the plurality of features. Each edge can represent a relationship between two nodes in the set of nodes (e.g., relationships among the plurality of features of the data files). As a result, the computing system 102 can obtain the relationships (e.g., interconnections and interrelationships) of the data files from various data sources with respect to the features of the data files. Such relationships provide extra insight that were not previously provided by the data sources for the data of the data files.

The computing system 102 can provide the generated graph database to a user device 108 over the network 104. The user device 108 can be associated with a developer that utilizes the insight of the data files provided in the graph database and develops data products artificial intelligence (AI)/machine learning (ML) algorithms and dashboards.

The computing system 102 can include one or more computing devices, such as a server. The number of computing devices may be scaled (e.g., increased or decreased) automatically as per the computation resources needed. The various functional components of the computing system 102 may be installed on one or more computers as separate functional components or as different modules of a same functional component. For example, the various components of the computing system 102 can be implemented as computer programs installed on one or more computers in one or more locations that are coupled to each through a network. In cloud-based systems for example, these components can be implemented by individual computing nodes of a distributed computing system.

The user device 108 can include personal computer, mobile communication device, and other devices that can communicate with the computing system 102 over the network 104. The network 104 can include a local area network ("LAN"), wide area network ("WAN"), the Internet, or a combination thereof. Each data source 106 can include one or more computing devices, such as a server. Each data source 106 can have its own database that stores its data files and corresponding data dictionaries.

Figure 2:
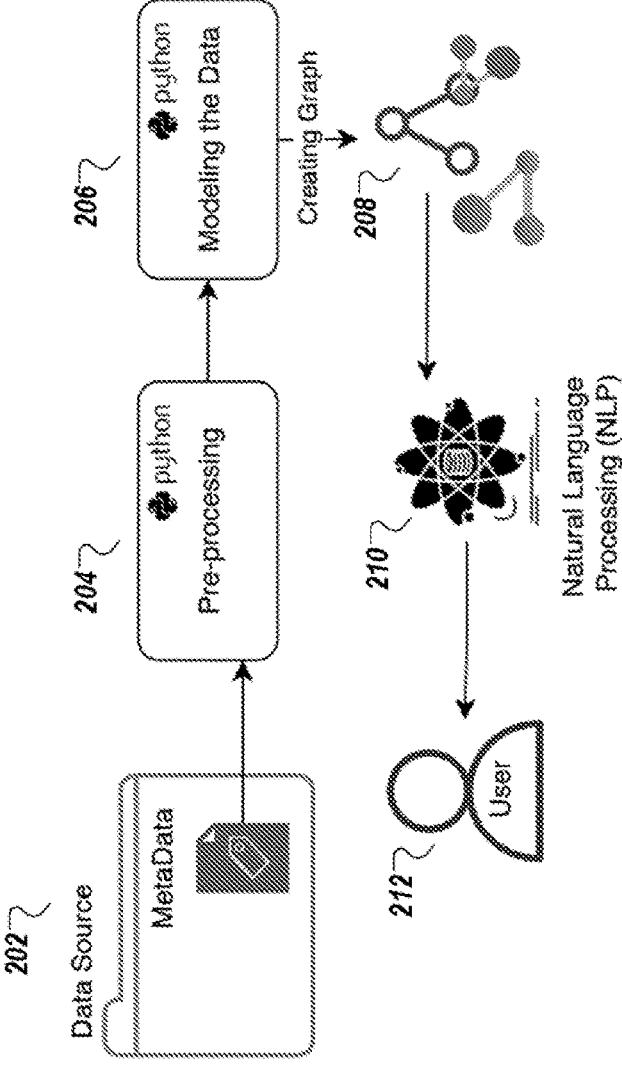
FIG. 2 is an example arrangement of processing phases for generating and using a graph database.

FIG. 2 is an example arrangement of processing phases 200 for generating and using a graph database in accordance with technology described herein. In some implementations, at least a portion of the process 400 can be executed at the computing system 102.

In a first phase, the computing system can receive metadata of data files from various data sources 202. The metadata can be the data dictionaries of the data files that includes a plurality of features for data of the data files. The plurality of features can include at least one of a file name, a table name, an attribute, a row name, and a column name.

In a second phase, the computing system can preprocess the received metadata 204 using data cleaning methods. The preprocessing of the metadata can include data cleaning, such as removing blank spaces in the metadata, and removing incorrect, corrupted, incorrectly formatted, or incomplete data within the metadata.

In a third phase, the computing system can model the metadata (e.g., data dictionaries) 206 to determine the relationships among the plurality of features included in the metadata. The relationships can be used as revised metadata representing content of the data files from the one or more data sources. In some implementations, additional metadata can be added, such as additional attributes for the metadata in the data dictionaries, for example, tags generated using the technology described herein. In some examples, the additional attributes can be obtained from internal systems of the computing system. For example, the metadata may include a key of a data file, such as a phone number. The additional attributes for the key can be additional information for the key, such as the phone number being associated with a particular area code and having a particular format. In some implementations, redundancy included in the various data dictionaries can be removed. For example, if the same attribute is named differently (or the same) in different data dictionaries, the computing system can categorize the same attribute included in the different data dictionaries (and thus in different data files) and remove the redundancy.

Determining the relationships among the plurality of features can include determining the relationships between any two features. For example, the relationships can include among the data files, relationships between the data files and the data sources, relationships among the data sources, relationships among attributes of different data files, and relationships between the attributes and the data files. For example, a relationship can be that a data file belongs to a data source. Another example relationship can be that a data file includes one or more attributes. Another example relationship can be that two attributes share a same tag, or two data sources share a same tag. Another example relationship can be that two data files share a same attribute with the same attribute being named the same or differently in the two data files.

Figure 3:
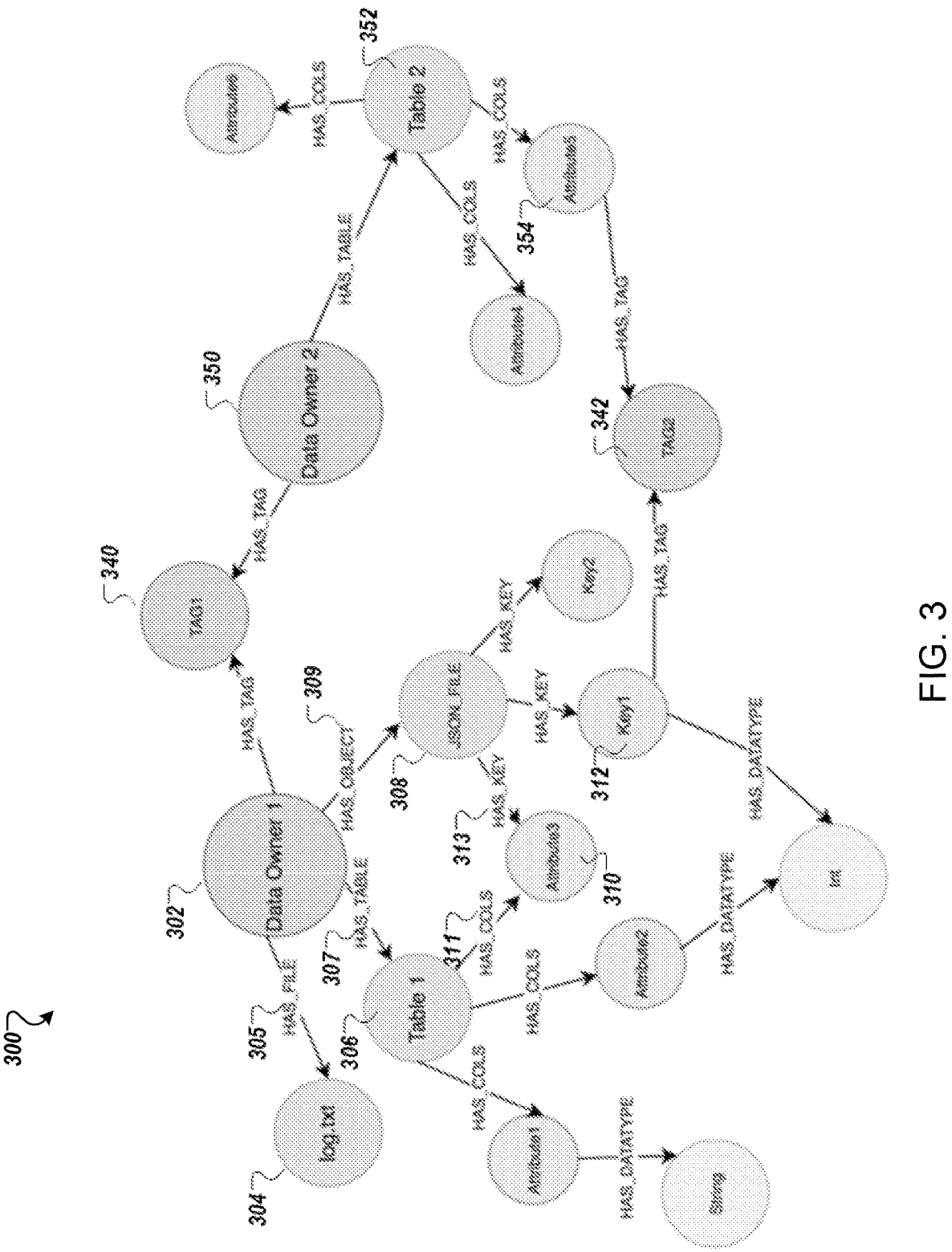
FIG. 3 is an example of the graph database representing metadata.

In a fourth phase, the computing system can generate a graph database 208 using the revise metadata that includes the relationships among the plurality of features of the data files of various data sources. The graph database can represent the content of the data files from the various data sources. The graph database can also represent the relationships of the data files from the various data sources. The graph database can be a directed graph that includes a set of nodes and a set of edges. Each node in the set of nodes can represent a feature of the plurality of features. Each edge can represent a relationship between two nodes in the set of nodes (e.g., relationships among the plurality of features of the data files). FIG. 3 provides an example of the graph database.

In a fifth phase, the computing system can extract patterns embedded in the graph database 210. The patterns can be extracted using natural language processing (NLP). The patterns can include the various relationships indicated by the edges in the graph database, such as newly derived relationships between different data files and/or different data sources. For instance, if a data file from data source 1 shares the same attribute with a data file from data source 2, such a relationship between the two data files from two different data sources can be extracted. Because such relationships can provide new insights for data files from disparate data sources, exploring such relationships can be beneficial for data product development.

In a sixth phase, the computing system can provide the graph database and the extracted patterns to a user device 212. A user (e.g., developer) can utilize the insight of the data profiles (represented by the newly derived relationships in the graph database) to develop data product or retrieve required data in a fast and efficient way.

FIG. 3 is an example of the graph database 300 representing metadata. The graph database 300 represent metadata of data files from two data sources/owners. The nodes in the graph database 300 include the plurality of features of the data files, including data sources/owners, data file names, attributes including keys, and tags. The edges in the graph database 300 represent the relationships between two nodes (e.g., relationships among the plurality of features of the data files from the two data sources).

For example, the relationships can be that the "Data Source 1" 302 has a data file named "log.txt" 304, has a table named "Table 1" 306, and has an object "JSON_FILE" 308. Such relationships are represented by edges 305, 307, and 309. In some implementations, the edges can be directed line with labels indicating the specific relationships. For example, the relationship of "Data Source 1" 302 having a data file named "log.txt" 304 can be represented by an edge 305 directed from the node "Data Source 1" 302 to the node "log.txt" 304. The label of the edge 305 can be "has file" to indicate the specific relationship.

In some examples, a relationship can be a data file including certain attributes or keys. For instance, the table named "Table 1" 306 can include "Attribute3" 310. The object data file named "JASON_FILE" 308 can include the same attribute "Attribute3" 310 as a key. Such relationships can be represented by the edge 311 directed from the node "Table 1" 306 to the node "Attribute3" 310 with label "has column" and by the edge 313 directed from the node "JASON_FILE" 308 to the node "Attribute3" 310 with label "has key."

In some examples, a relationship can be two data files sharing the same attribute. Because the graph database includes the two edges 311 and 313 having a common node 310, the graph database indicates the relationship between the two data files "Table 1" 306 and "JASON_FILE" 308 that the two data files share the same attribute "Attribute3" 310.

In some examples, a relationship can be two data sources sharing the same tag. For example, "Data Source 1" 302 and "Data Source 2" 350 share the same tag "TAG 1" 340. In some examples, a relationship can be two attributes from data files of two separate data sources share the same tag. For example, the attribute "Key1" 312 of the data file "JASON_FILE" 308 from "Data Source 1" 302 and the attribute "Attribute5" 354 of the data file "Table 2" 352 from "Data Source 2" 350 share the same tag "TAG2" 342.

Figure 4:
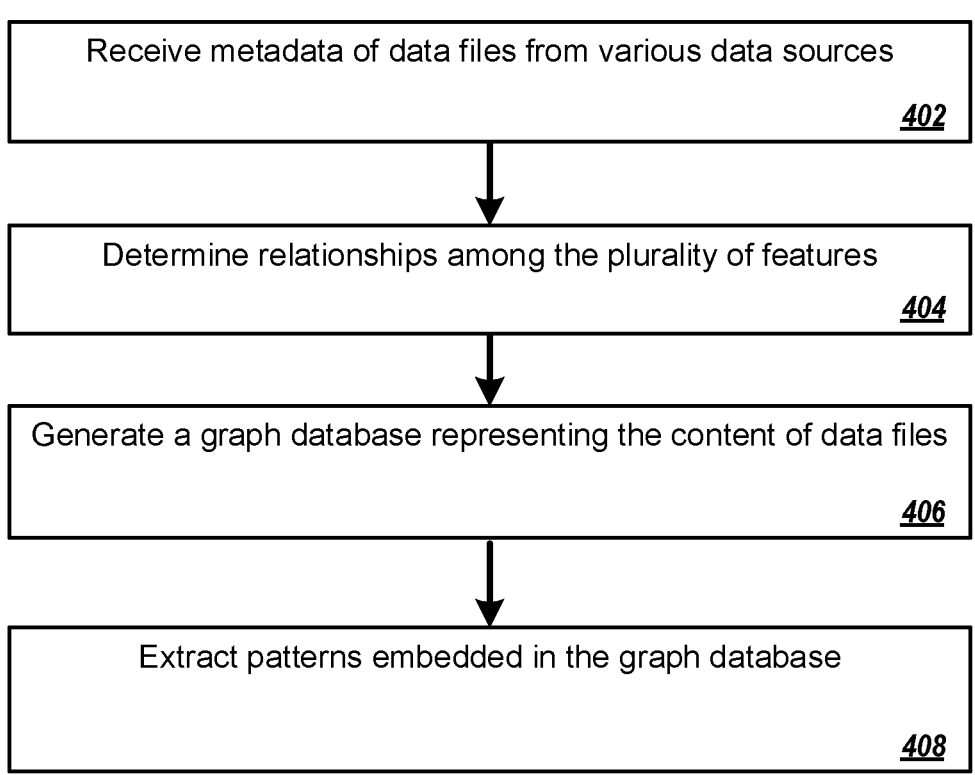
FIG. 4 is flow diagram of an example process for generating and using a graph database.

FIG. 4 is a flow diagram of an example process 400 for generating and using a graph database. In some implementations, at least a portion of the process 400 can be executed at the computing system 102.

At step 402, the computing system can receive metadata of data files from various data sources. The metadata can be the data dictionaries of the data files that includes a plurality of features of associated data included in the data files. The plurality of features can include at least one of a file name, a table name, an attribute, a row name, and a column name.

At step 404, the computing system can determine relationships among the plurality of features to generate revised metadata representing content of the data files from the one or more data sources.

In some implementations, the computing system can preprocess the received metadata using data cleaning methods. After preprocessing, the computer system can determine the relationships among the plurality of features. In some implementations, additional metadata can be added, such as additional attributes for the metadata in the data dictionaries, or data categories via tags. In some examples, the additional attributes can be obtained from internal systems of the computing system. In some implementations, redundancy included in the various data dictionaries can be removed. For example, if the same attribute is named differently (or the same) in different data dictionaries, the computing system can categorize the same attribute included in the different data dictionaries (and thus in different data files) and remove the redundancy.

Determining the relationships among the plurality of features can include determining the relationships between any two features. For example, a relationship can be that a data file belongs to a data source. Another example relationship can be that a data file includes one or more attributes. Another example relationship can be that two attributes share a same tag, or two data sources share a same tag. In some implementations, the computing system can recognize the same attribute included in different metadata of different data files. The computing system can thus recognize that different data files share the same attribute when the same attribute is named the same or differently in different data files.

At step 406, the computing system can generate a graph database representing the content of data files from the one or more data sources. The graph database can be generated using the revise metadata that includes the relationships among the plurality of features of the data files. The graph database can represent the content of the data files from the various data sources. The graph database can also represent the relationships of the data files from the various data sources. The graph database can be a directed graph that includes a set of nodes and a set of edges. Each node in the set of nodes can represent a feature of the plurality of features. Each edge can represent a relationship between two nodes in the set of nodes (e.g., relationships among the plurality of features of the data files).

At step 408, the computing system can extract patterns embedded in the graph database. The patterns can be extracted using natural language processing (NLP). In some implementations, extracting the patterns embedded in the graph database can include extracting newly derived relationships between different data files or different data sources that are included in the graph database.

The order of steps in the process 400 described above is illustrative only, and the process 400 can be performed in different orders. In some implementations, the process 400 can include additional steps, fewer steps, or some of the steps can be divided into multiple steps.

Figure 5:
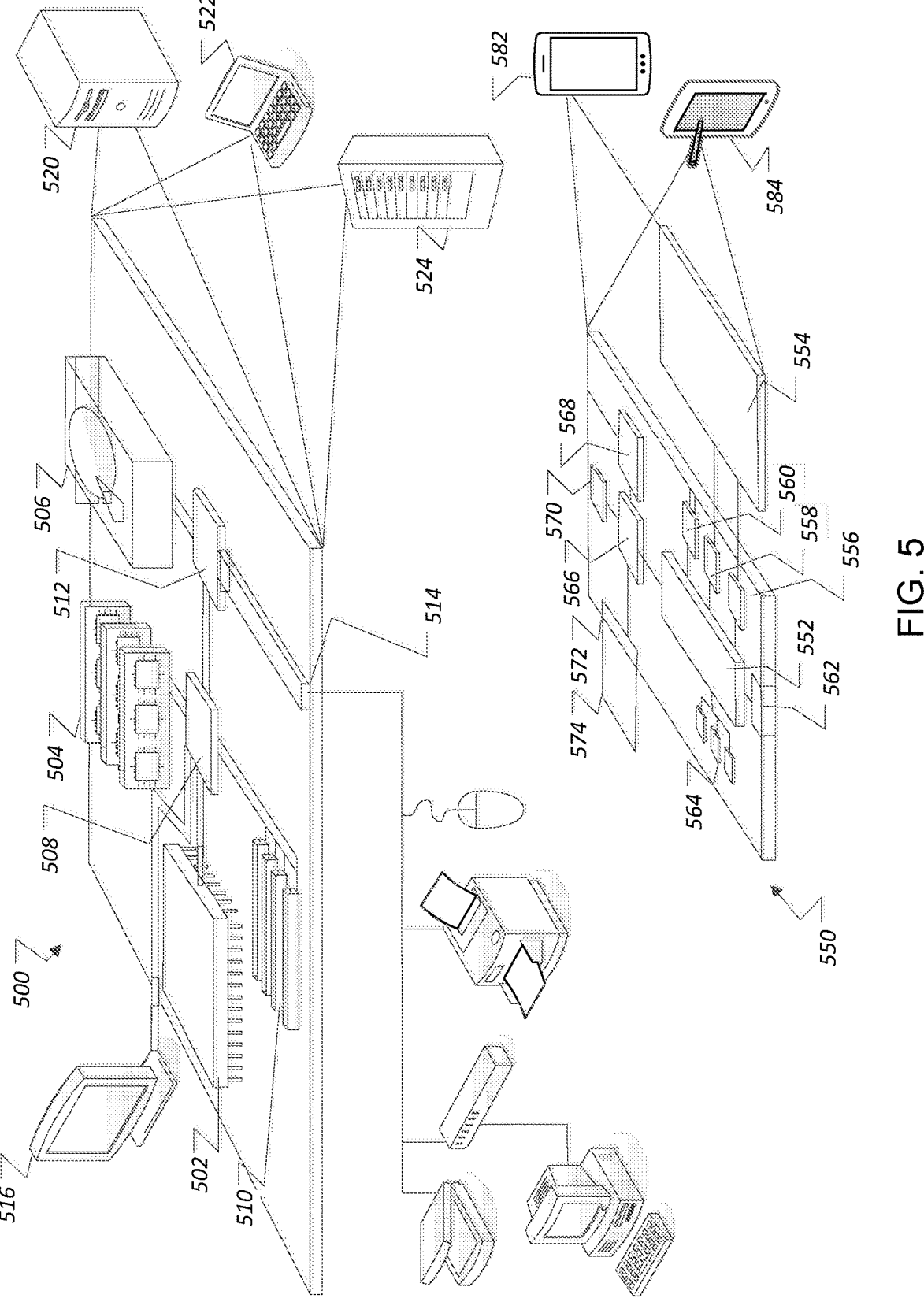
FIG. 5 illustrates block diagrams of example computing devices.

FIG. 5 shows an example of a computing device 500 and a mobile computing device 550 (also referred to herein as a wireless device) that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 500 can form at least a portion of the computing system 102.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506.

Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. Other implementations may include a phone device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

11

The invention claimed is:

1. A computer-implemented method comprising:

receiving, at one or more computing devices, first metadata associated with data files from multiple data sources, the first metadata representing a first set of features of the data files from the multiple data sources, wherein the first set of features represent, in part, first content of the data files;

generating, by the one or more computing devices, an adjusted set of features by adjusting the first set of features, wherein the adjusting of the first set of features comprises at least one of: (i) including additional metadata that is associated with aspects of the first content of the data files that were not represented by the first set of features, and (ii) categorizing at least two attributes, wherein each attribute includes a different name from the first set of features as a same attribute;

generating, by the one or more computing devices, a directed graph representing the data files from the multiple data sources and relationships among the first set of features and the adjusted set of features, the directed graph including a set of nodes and a set of edges, wherein each node in the set of nodes represents a feature of the first set of features or the adjusted set of features, and each edge represents a relationship between two nodes in the set of nodes;

extracting, by the one or more computing devices using natural language processing, patterns including various relationships indicated by the edges in the directed graph;

providing the directed graph and the extracted patterns to a computing device to retrieve the one or more files of the data files; and retrieving, using the directed graph representing the data files from the multiple data sources and by the computing device, the one or more files of the data files from the multiple data sources represented by the directed graph.

2. The computer-implemented method of claim 1, wherein the first metadata of a data file of the data files are included in a data dictionary associated with the data file.

3. The computer-implemented method of claim 1, wherein generating the directed graph comprises: determining that two data files share an attribute, wherein the attribute is named similarly or differently in the two data files; determining that a data file belongs to a data source or includes one or more attributes; and determining that two nodes share a same tag.

4. The computer-implemented method of claim 1, wherein extracting the patterns including various relationships indicated by the edges in the directed graph comprises further comprising: determining patterns from the directed graph using the natural language processing.

5. The computer-implemented method of claim 1, wherein: nodes included in the directed graph represent one or more of: the data files, the multiple data sources, attributes, and tags, and edges included in the directed graph represent relationships among the data files, relationships between the data files and the multiple data sources, relationships among the multiple data sources, relationships among the attributes, and relationships between the attributes and the data files.

6. The method of claim 1, wherein the at least two attributes from the first set of features that are categorized as the same attribute are associated with different data sources of the multiple data sources.

12

7. The computer-implemented method of claim 1, wherein the adjusting of the first set of features comprises:

including the additional metadata that is associated with aspects of the first content of the data files that were not represented by the first set of features; and categorizing at least the two attributes, wherein each attribute includes a different name from the first set of features as the same attribute.

8. A non-transitory computer-readable medium encoded with instructions that, when executed by one or more computers, cause the one or more computers to perform operations comprising:

receiving, at one or more computing devices, first metadata associated with data files from multiple data sources, the first metadata representing a first set of features of the data files from the multiple data sources, wherein the first set of features represent, in part, first content of the data files;

generating, by the one or more computing devices, an adjusted set of features by adjusting the first set of features, wherein the adjusting of the first set of features comprises at least one of (i) including additional metadata that is associated with aspects of the first content of the data files that were not represented by the first set of features, and (ii) categorizing at least two attributes, wherein each attribute includes a different name from the first set of features as a same attribute;

generating, by the one or more computing devices, a directed graph representing the data files from the multiple data sources and relationships among the first set of features and the adjusted set of features, the directed graph including a set of nodes and a set of edges, wherein each node in the set of nodes represents a feature of the first set of features or the adjusted set of features, and each edge represents a relationship between two nodes in the set of nodes;

extracting, by the one or more computing devices using natural language processing, patterns including various relationships indicated by the edges in the directed graph;

providing the directed graph and the extracted patterns to a computing device to retrieve the one or more files of the data files;

and retrieving, using the directed graph representing the data files from the multiple data sources and by the computing device, the one or more files of the data files from the multiple data sources represented by the directed graph.

9. The non-transitory computer-readable medium of claim 8, wherein the first metadata of a data file of the data files are included in a data dictionary associated with the data file.

10. The non-transitory computer-readable medium of claim 8, wherein generating the directed graph comprises: determining that two data files share an attribute, wherein the attribute is named similarly or differently in the two data files; determining that a data file belongs to a data source or includes one or more attributes; and determining that two nodes share a same tag.

11. The non-transitory computer-readable medium of claim 8, wherein the at least two attributes from the first set of features that are categorized as the same attribute are associated with different data sources of the multiple data sources.

12. The non-transitory computer-readable medium of claim 8, wherein the adjusting of the first set of features comprises: including the additional metadata that is associated with aspects of the first content of the data files that were not represented by the first set of features; and categorizing at least the two attributes, wherein each attribute includes a different name from the first set of features as the same attribute.

13. The non-transitory computer-readable medium of claim 8, wherein extracting the patterns including various relationships indicated by the edges in the directed graph comprises the operations further comprise: determining patterns from the directed graph using the natural language processing.

14. The non-transitory computer-readable medium of claim 8, wherein: nodes included in the directed graph represent one or more of: the data files, the multiple data sources, attributes, and tags, and edges included in the directed graph represent relationships among the data files, relationships between the data files and the multiple data sources, relationships among the multiple data sources, relationships among the attributes, and relationships between the attributes and the data files.

15. A system comprising one or more computers and one or more storage devices on which are stored instructions that are operable, when executed by the one or more computers, to cause the one or more computers to perform operations comprising:

receiving first metadata associated with data files from multiple data sources, the first metadata representing a first set of features of the data files from the multiple data sources, wherein the first set of features represent, in part, first content of the data files;

generating, by one or more computing devices, an adjusted set of features by adjusting the first set of features, wherein the adjusting of the first set of features comprises at least one of: (i) including additional metadata that is associated with aspects of the first content of the data files that were not represented by the first set of features, and (ii) categorizing at least two attributes, wherein each attribute includes a different name from the first set of features as a same attribute;

generating, by the one or more computing devices, a directed graph representing the data files from the multiple data sources and relationships among the first set of features and the adjusted set of features, the directed graph including a set of nodes and a set of edges, wherein each node in the set of nodes represents a feature of the first set of features or the adjusted set of features, and each edge represents a relationship between two nodes in the set of nodes;

extracting, by the one or more computing devices using natural language processing, patterns including various relationships indicated by the edges in the directed graph;

providing the directed graph and the extracted patterns to a computing device to retrieve the one or more files of the data files; and retrieving, using the directed graph representing the data files from the multiple data sources and by the computing device, the one or more files of the data files from the multiple data sources represented by the directed graph.

16. The system of claim 15, wherein the first metadata of a data file of the data files are included in a data dictionary associated with the data file.

17. The system of claim 15, wherein generating the directed graph comprises:

determining that two data files share an attribute, wherein the attribute is named the same or differently in the two data files;

determining that a data file belongs to a data source or includes one or more attributes; and determining that two nodes share a same tag.

18. The system of claim 15, wherein: nodes included in the directed graph represent one or more of: the data files, the multiple data sources, attributes, and tags, and edges included in the directed graph represent relationships among the data files, relationships between the data files and the multiple data sources, relationships among the multiple data sources, relationships among the attributes, and relationships between the attributes and the data files.

19. The system of claim 15, wherein the at least two attributes from the first set of features that are categorized as the same attribute are associated with different data sources of the multiple data sources.

20. The system of claim 15, wherein the adjusting of the first set of features comprises: including the additional metadata that is associated with aspects of the first content of the data files that were not represented by the first set of features; and categorizing at least the two attributes, wherein each attribute includes a different name from the first set of features as the same attribute.

* * * * *